US012712966B1

(12) United States Patent
Kamisetti et al.

(10) Patent No.: US 12,712,966 B1
(45) Date of Patent: Aug. 18, 2026

(54) PRIVATE BRANCH EXCHANGE HIGH AVAILABILITY SERVER

(71) Applicant: Zoom Communications, Inc., San Jose, CA (US)

(72) Inventors: Jagadish Kamisetti, Round Rock, TX (US); Preet Patel, San Jose, CA (US); George John Thomas, Pleasanton, CA (US); Haibing Xu, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 120 days.

(21) Appl. No.: 18/651,178

(22) Filed: Apr. 30, 2024

(51) Int. Cl.
*H04M 3/42* (2006.01)
*H04Q 3/62* (2006.01)

(52) U.S. Cl.
CPC .......... *H04M 3/42314* (2013.01); *H04Q 3/62* (2013.01); *H04Q 2213/1322* (2013.01)

(58) Field of Classification Search
CPC ... G06F 30/392; G06F 40/30; H04L 12/1822; H04L 47/2441; H04L 65/1036; H04L 65/406; H04L 65/611; H04L 12/1813; H04M 3/42314; H04M 3/436; H04M 7/1255; H04M 3/38; H04M 3/387; H04M 3/42221; H04M 3/42263; H04M 3/56; H04M 3/562; H04M 3/567; H04M 7/006; H04M 7/1235; H04Q 3/62; H04Q 3/72; H04Q 2213/1322; H04Q 3/0029; H04Q 3/545; H04Q 11/04; H04W 4/023; G11B 31/00
See application file for complete search history.

(56) References Cited

U.S. PATENT DOCUMENTS

| | | | | |
|---|---|---|---|---|
| 5,953,399 | A * | 9/1999 | Farris | H04Q 3/0029 379/221.09 |
| 6,366,656 | B1 * | 4/2002 | Lee | H04Q 3/545 379/88.07 |
| 7,889,849 | B2 * | 2/2011 | Chatterjee | H04M 7/1235 379/202.01 |
| 8,125,888 | B2 | 2/2012 | Kandikonda et al. | |
| 8,315,165 | B2 | 11/2012 | Eydelman et al. | |
| 9,060,049 | B2 * | 6/2015 | Laasik | H04L 65/4061 |
| 10,652,305 | B2 | 5/2020 | Escude et al. | |
| 11,431,844 | B1 * | 8/2022 | Chau | H04M 3/436 |
| 11,546,464 | B1 * | 1/2023 | Ruinskaya | H04M 3/42314 |
| 12,452,361 | B1 * | 10/2025 | Hong | G06F 30/392 |
| 12,500,786 | B1 * | 12/2025 | Hong | H04L 12/1822 |
| 2004/0072593 | A1 * | 4/2004 | Robbins | H04M 7/1255 455/554.1 |

(Continued)

FOREIGN PATENT DOCUMENTS

GB 2458553 A 9/2009

*Primary Examiner* — Gerald Gauthier
(74) *Attorney, Agent, or Firm* — Young Basile Hanlon & MacFarlane, P.C.

(57) ABSTRACT

A first device transmits an invite message to a first server to establish a call with a second device. The first server modifies the invite message to obtain a modified invite message. The first server simultaneously transmits the modified invite message to a primary server associated with the second device and one or more backup servers associated with the second device. The server receives a response message that indicates successful processing of the modified invite message from a second server. The first server establishes the call via the second server.

20 Claims, 8 Drawing Sheets

(56) References Cited

U.S. PATENT DOCUMENTS

2005/0084078 A1* 4/2005 Miller ...................... H04Q 3/72 379/88.19
2005/0094793 A1* 5/2005 D'Agosto ......... H04M 3/42221 379/202.01
2006/0030357 A1* 2/2006 McConnell ....... H04M 3/42314 455/554.1
2008/0317008 A1* 12/2008 Forte-McRobbie ......................... H04L 65/1036 370/352
2010/0316201 A1* 12/2010 Miller ................... H04M 7/006 379/202.01
2011/0305238 A1* 12/2011 Ikuta ..................... H04L 65/611 370/352
2014/0204954 A1* 7/2014 Nee ..................... H04L 47/2441 370/401
2022/0248204 A1* 8/2022 Anderson ............. H04W 4/023
2023/0032753 A1* 2/2023 Swerdlow ............... G06F 40/30
2023/0164264 A1* 5/2023 Anderson ......... H04M 3/42314 379/202.01
2023/0421692 A1* 12/2023 Nguyen ................ H04M 3/436

* cited by examiner

PRIVATE BRANCH EXCHANGE HIGH AVAILABILITY SERVER

FIELD

This disclosure generally relates to telecommunications, and, more specifically, to high availability server communications during a call setup.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Conventional telephony systems, such as those of software platforms (e.g., UCaaS platforms), that use a cloud-based private branch exchange (PBX) for audio calls are typically configured to fail over to a backup node server during registration. The typical failover methods include using ping-pong or transport layer security (TLS) timeout to support high availability during registration. These methods, however, only ensure the provision of client level high availability during registration and introduce delays in connectivity, leading to call disruptions.

Implementations of this disclosure address problems such as these by configuring a system to simultaneously transmit modified invites to both a primary PBX server and one or more backup PBX servers associated with a destination device (i.e., a device receiving a call) to identify which PBX server the destination device is currently registered. The modified invites are modified by a PBX server associated with a source device (i.e., a device initiating the call) such that they are identifiable by the primary PBX server and the one or more backup PBX servers associated with a destination device. The system is configured to receive, from a PBX server to which the destination device is registered, a response message that indicates that the modified invite has been successfully processed. The PBX server can be the primary PBX server or one of the backup PBX servers associated with the destination device. The system is configured to setup the call via the PBX server from which the response message is received. By identifying the PBX server to which the destination device is registered during the call setup, the ping-pong scenario can be avoided and the call can be initiated without disruptions.

Figure 1:
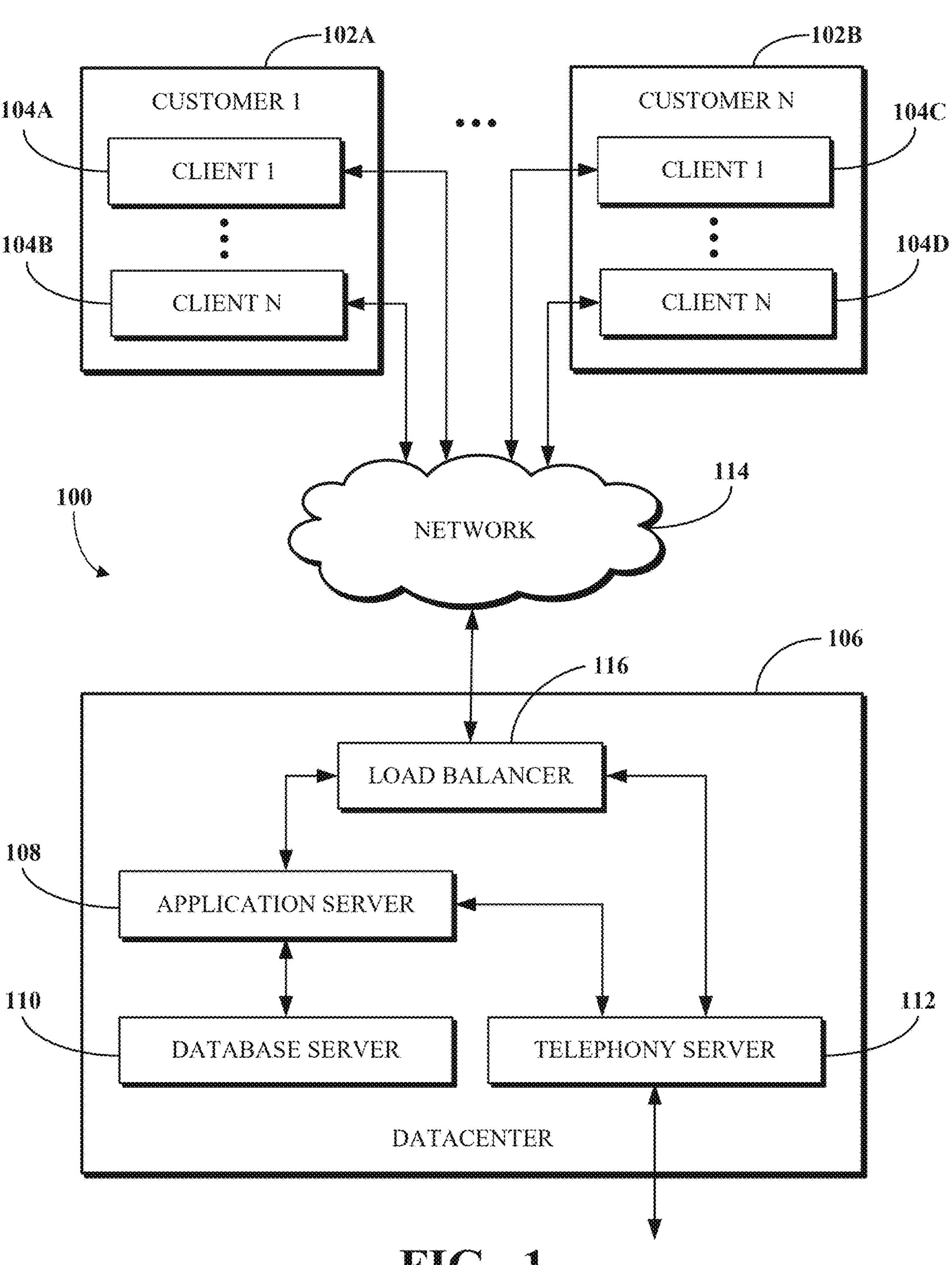
FIG. 1 is a block diagram of an example of an electronic computing and communications system.

To describe some implementations in greater detail, reference is first made to examples of hardware and software structures used to implement a system for providing high availability telephony services during a call setup. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a PBX system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
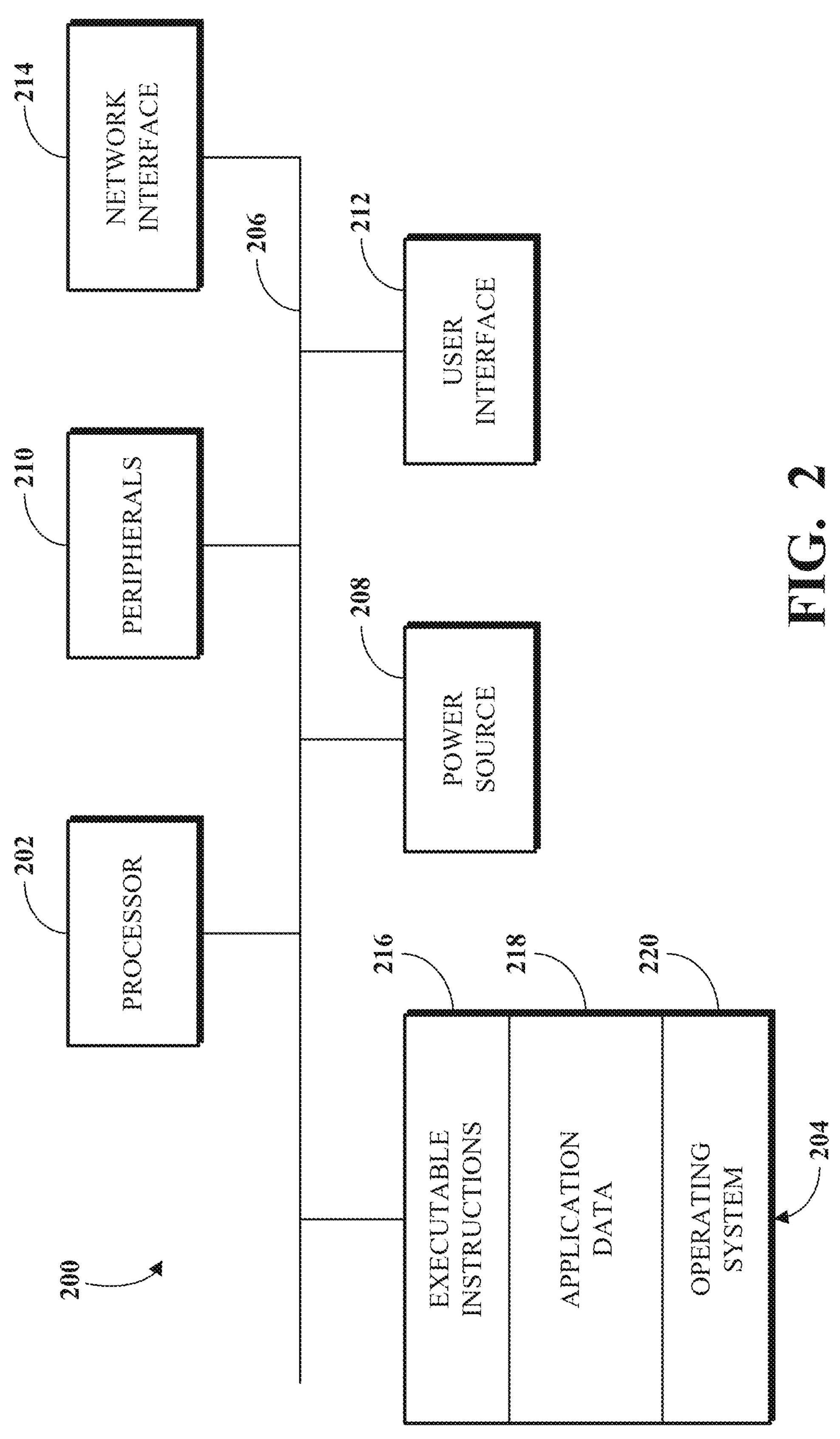
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
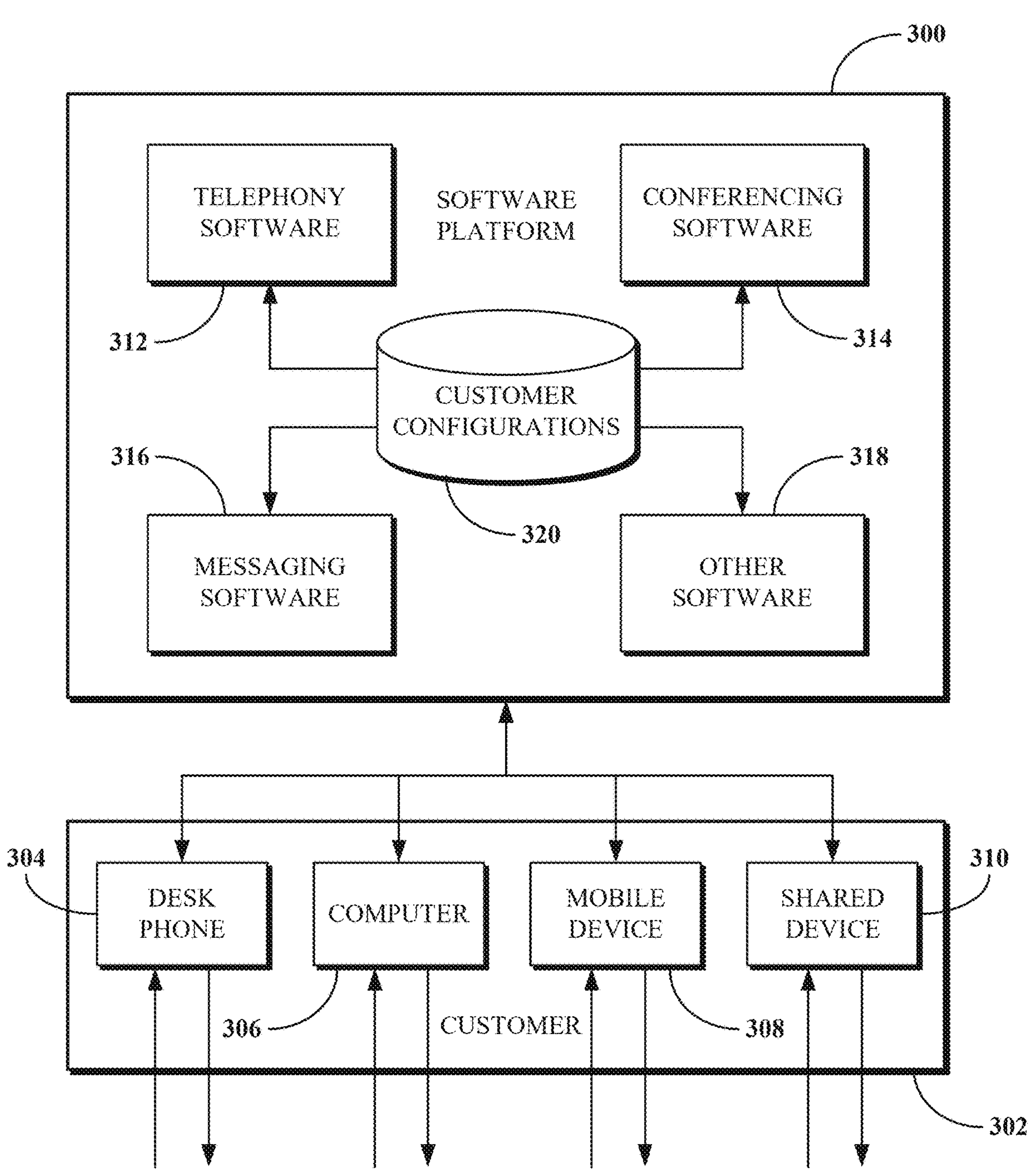
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can provide high availability telephony services during a call setup. In some such cases, the telephony software 312 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
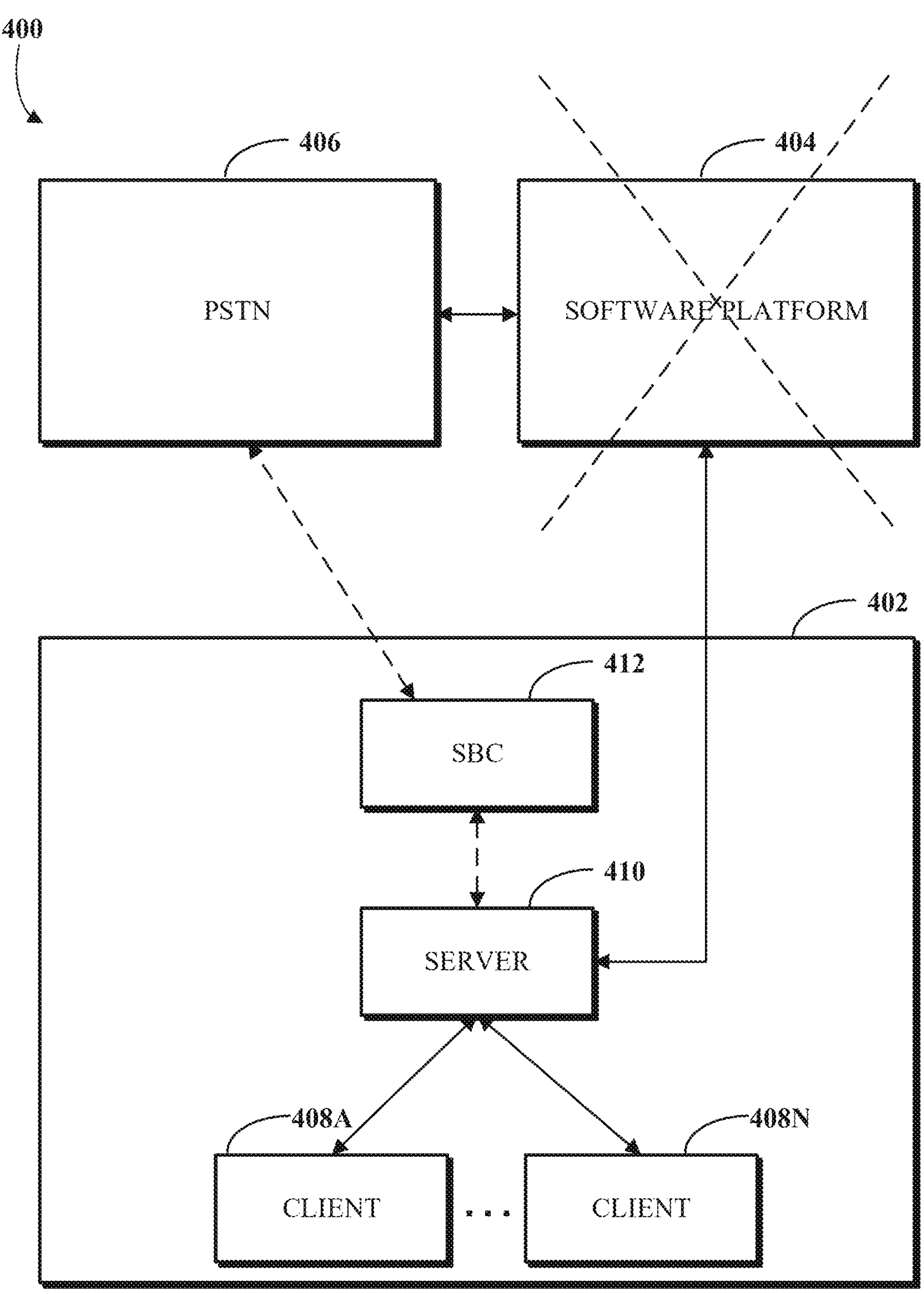
FIG. 4 is a block diagram of an example of a system for providing high availability telephony services during an outage.

FIG. 4 is a block diagram of an example of a system 400 for providing high availability telephony services during an outage. The system 400 includes a customer 402, a software platform 404, and a PSTN 406. The customer 402 may, for example, be the customer 102A or 102B shown in FIG. 1 or the customer 302 shown in FIG. 3. The software platform 404 may, for example, be a UCaaS platform, such as the software platform 300 shown in FIG. 3.

The customer 402 includes clients 408A through 408N, a server 410, and an SBC 412. The clients 408A through 408N may be any combination of client devices, for example, one or more of at least one of the desk phone 304, the computer 306, the mobile device 308, and/or the shared device 310 shown in FIG. 3. The server 410 may be a high availability PBX server that is configured to route calls via the SBC 412 when there is a failure event at the software platform 404.

Under normal conditions (i.e., when there is no failure event at the software platform 404), The server 410 is configured to route calls from the clients 408A through 408N to the software platform 404. The software platform 404 is configured to route the calls to the PSTN 406. Similarly, when a call destined to one of the clients 408A through 408N is received at the PSTN 406, the PSTN 406 routes the call to the software platform 404. The software platform 404 routes the call to the server 410, and the server 410 routes the call to the appropriate destination client (i.e., one of clients 408A through 408N).

When there is a failure event at the software platform 404, the server 410 is configured to route calls from the clients 408A through 408N to the SBC 412. The SBC 412 is configured to route the calls to the PSTN 406. Similarly, when a call destined to one of the clients 408A through 408N is received at the PSTN 406 during a failure event at the software platform 404, the PSTN 406 routes the call to the SBC 412. The SBC 412 routes the call to the server 410, and the server 410 routes the call to the appropriate destination client (i.e., one of clients 408A through 408N).

Figure 5:
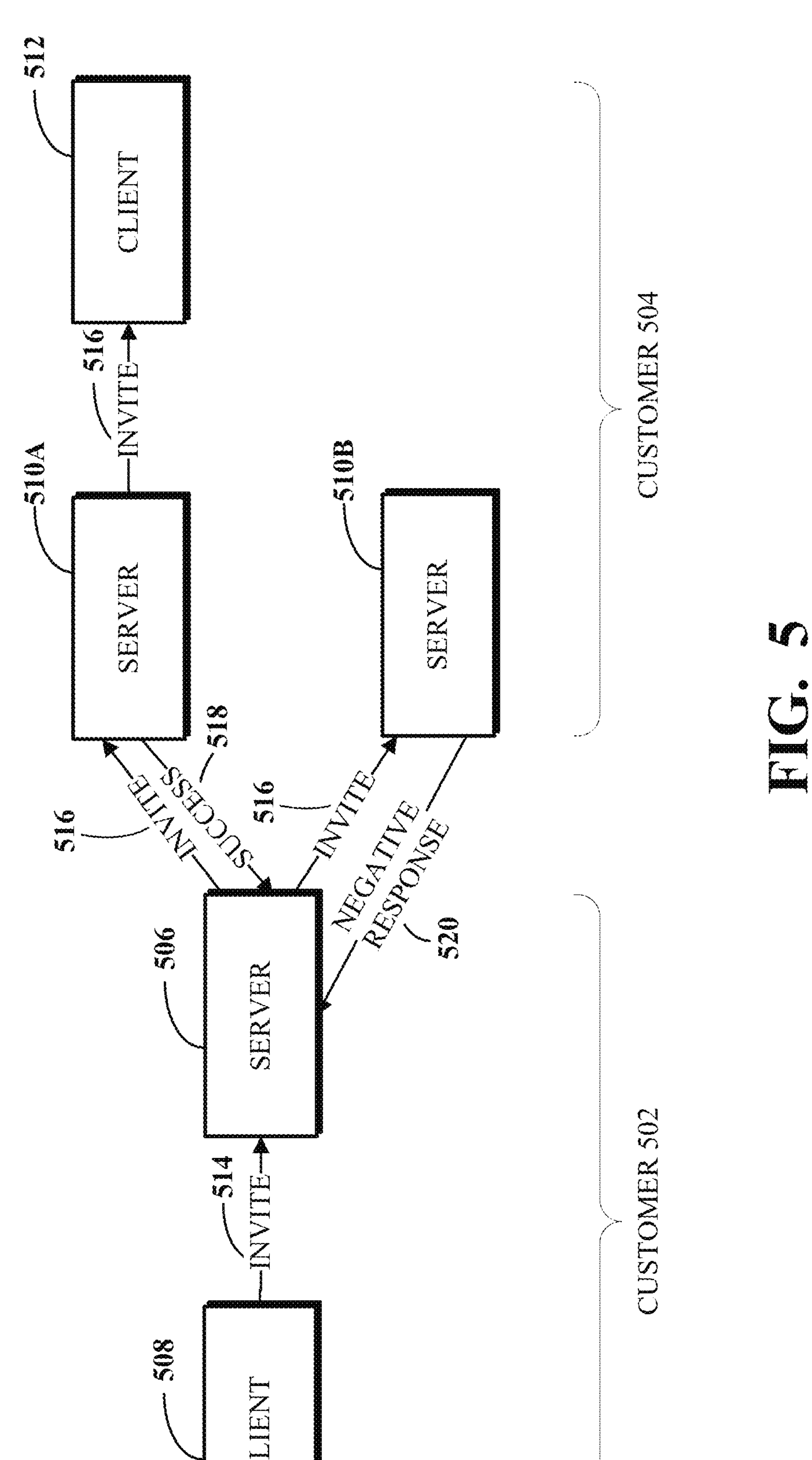
FIG. 5 is a block diagram of an example of a system for providing high availability telephony services during a call setup.

FIG. 5 is a block diagram of an example of a system 500 for providing high availability telephony services during a call setup. The system 500 includes customer 502 and customer 504. In this example, the customer 502 and the customer 504 are separate customers and may each be a customer such as the customer 402 shown in FIG. 4. The customer 502 includes a server 506 and a client 508. The server 506 may be a server, such as the server 410 shown in FIG. 4. The client 508 may be a client, such as any one of the clients 408A through 408N shown in FIG. 4.

The customer 504 includes server a 510A, a server 510B, and a client 512. The client 512 may be a client, such as any one of the clients 408A through 408N shown in FIG. 4. The server 510A and the server 510B may each be a server, such as the server 410 shown in FIG. 4. In this example, the server 510A may be a primary server and the server 510B may be a backup server. Although only one backup server is shown, it is understood that the customer 504 may include more than one backup server. In this example, the client 512 is associated with the server 510A and the server 510B and is currently registered to the server 510A. The client 512 can be associated with any number of servers (i.e., a primary server and one or more backup servers), however, the client 512 is configured to be registered to one server at a time. If there is a failure event at the server 510A, the client 512 is configured to failover to the server 510B. When the client 512 performs a failover to the server 510B, the client 512 performs a registration process to register to the server 510B.

In this example, the client 508 transmits an invite message 514 to the server 506 to initiate a call with the client 512. The server 506 receives the invite message 514 and generates an invite message 516. The invite message 516 is a modified invite message that includes a header that is identifiable by a primary server (e.g., server 510A) and one or more backup servers (e.g., server 510B). The header of the invite message 516 may indicate that an X-CROSS-NODE parameter is enabled. The server 506 is configured to simultaneously transmit the invite message 516 to the server 510A and the server 510B. The invite message 516 is transmitted to the server 510A and the server 510B based on the extension number of the client 512.

The server 510A receives the invite message 516 and determines whether the client 512 is registered to the server 510A. In this example, it is determined that the client 512 is registered to the server 510A. Based on the determination that the client 512 is registered to the server 510A, the server 510A transmits a success message 518, such as a 200 OK message, to the server 506 and transmits the invite message 516 to the client 512 to establish the call. The server 510B receives the invite message 516 and determines whether the client 512 is registered to the server 510B. In this example, it is determined that the client 512 is not registered to the server 510B. In response to the determination that the client 512 is not registered to the server 510B, the server transmits a negative response 520 to the server 506. The negative response 520 may be a delayed response that indicates that the client 512 is not registered to the server 510B. The negative response 520 may be delayed to avoid a collision with the success message 518. In some examples, instead of transmitting the negative response 520, the server 510B may time out. If the invite message 516 gets timed out by the server 510B, the server 506 determines that the client 512 is not registered to the server 510B based on the absence of receiving a response to the invite message 516.

Figure 6:
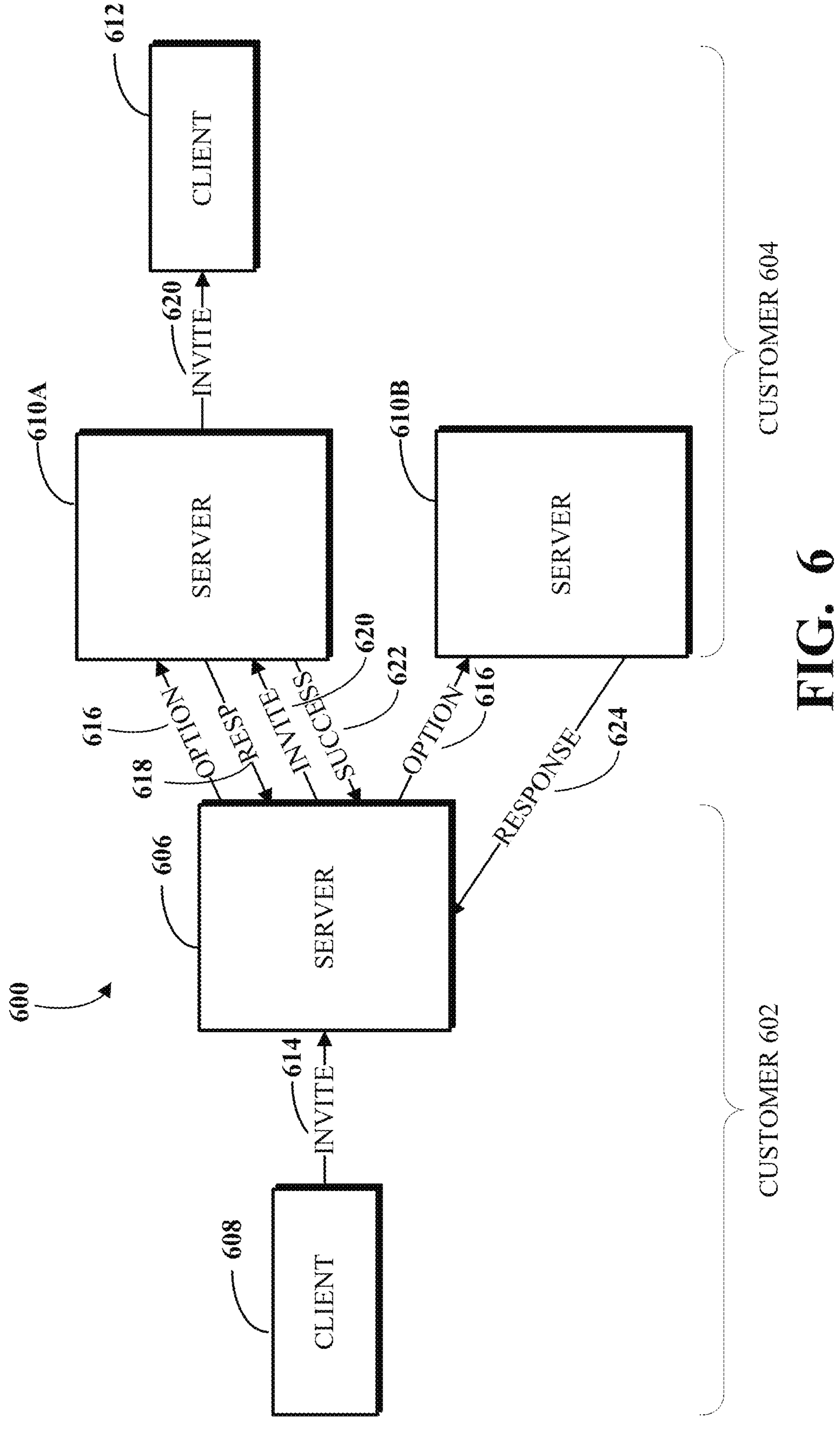
FIG. 6 is a block diagram of another example of a system for providing high availability telephony services during a call setup.

FIG. 6 is a block diagram of another example of a system 600 for providing high availability telephony services during a call setup. The system 600 includes customer 602 and customer 604. In this example, the customer 602 may be the customer 502 shown in FIG. 5, and the customer 604 may be the customer 504 shown in FIG. 5. The customer 602 includes a server 606 and a client 608. The client 606 may be the client 506 shown in FIG. 5, and the server 606 may be the server 506 shown in FIG. 5.

The customer 604 includes server a 610A, a server 610B, and a client 612. The server 610A, the server 610B, and the client 612 may respectively be the server 510A, the server 510B, and the client 512 shown in FIG. 5. In this example, the client 608 transmits an invite message 614 to the server 606 to initiate a call with the client 612. The server 606 receives the invite message 614 and generates an option ping request 616. The server 606 simultaneously transmits the option ping request 616 to the server 610A and the server 610B to obtain a health status and/or a registration status from the respective servers. The option ping request 616 is transmitted to the server 610A and the server 610B based on the extension number of the client 612.

The server 610A receives the option ping request 616 and transmits a response message 618 to the server 606. The response message 618 may be a 200 OK message that includes a health status and/or registration status of the server 610A. In this example, the health status of the server 610A is indicated as operational and the registration status indicates that the client 612 is registered to the server 610A.

The server 606 receives the response message 618 and generates an invite message 620. The invite message 620 is a modified invite message and may be the invite message 516 shown in FIG. 5. The server 606 transmits the invite message 620 to the server 610A. The server 610A receives the invite message 620 and transmits a success message 622, such as a 200 OK message, to the server 606 and transmits the invite message 620 to the client 612 to establish the call. The server 610B receives the option ping request 616 and transmits a response message 624 to the server 606. The response message 624 may indicate a health status of the server 610B, such as the service is unavailable, and/or indicate that the client 612 is not registered to the server 610B. The server 606 receives the response message 624. Based on the indication that the service is unavailable and/or that the client 612 is not registered to the server 610B, the server 606 does not transmit the invite message 620 to the server 610B.

Figure 7:
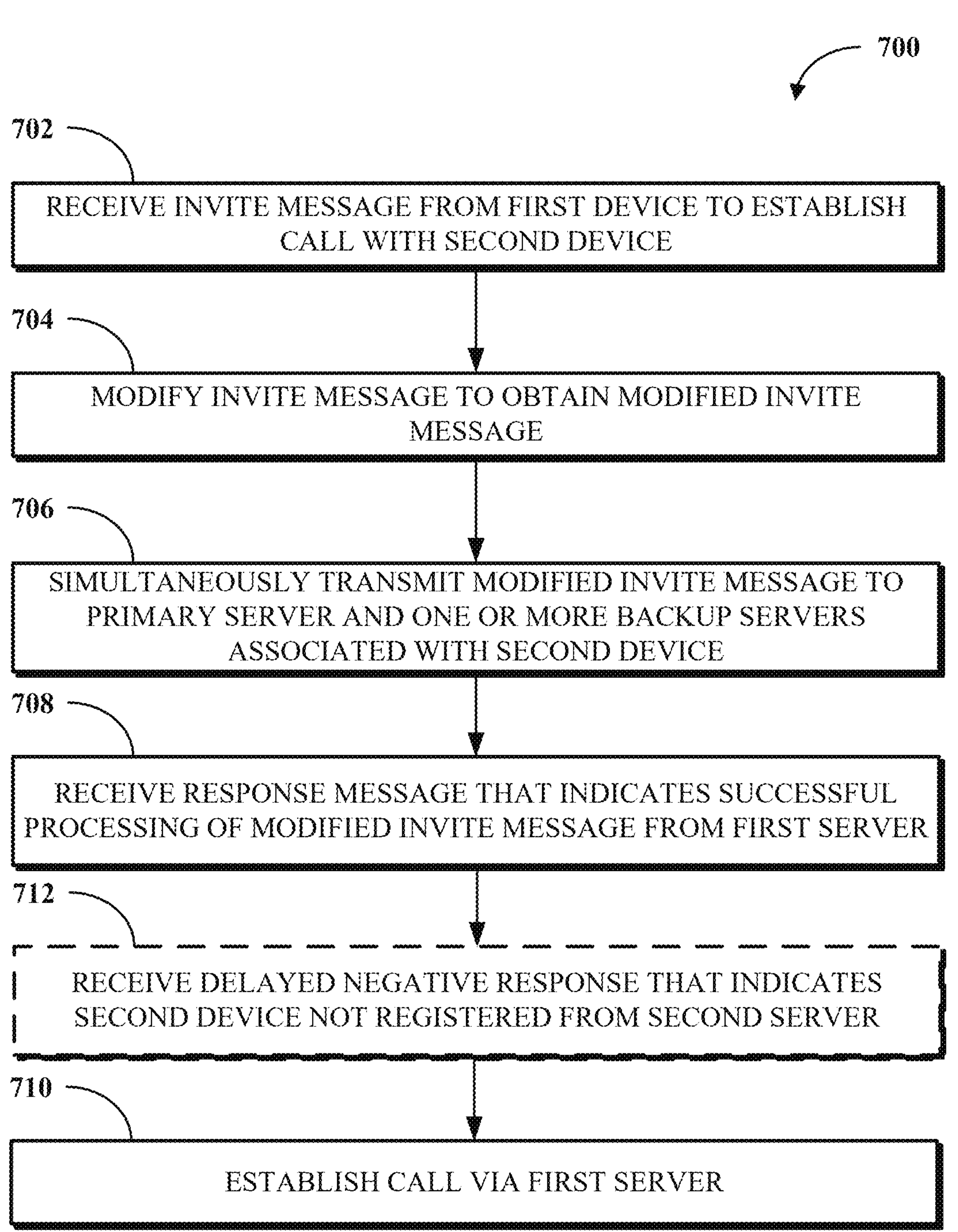
FIG. 7 is a flowchart of an example of a method for providing high availability telephony services during a call setup.
Figure 8:
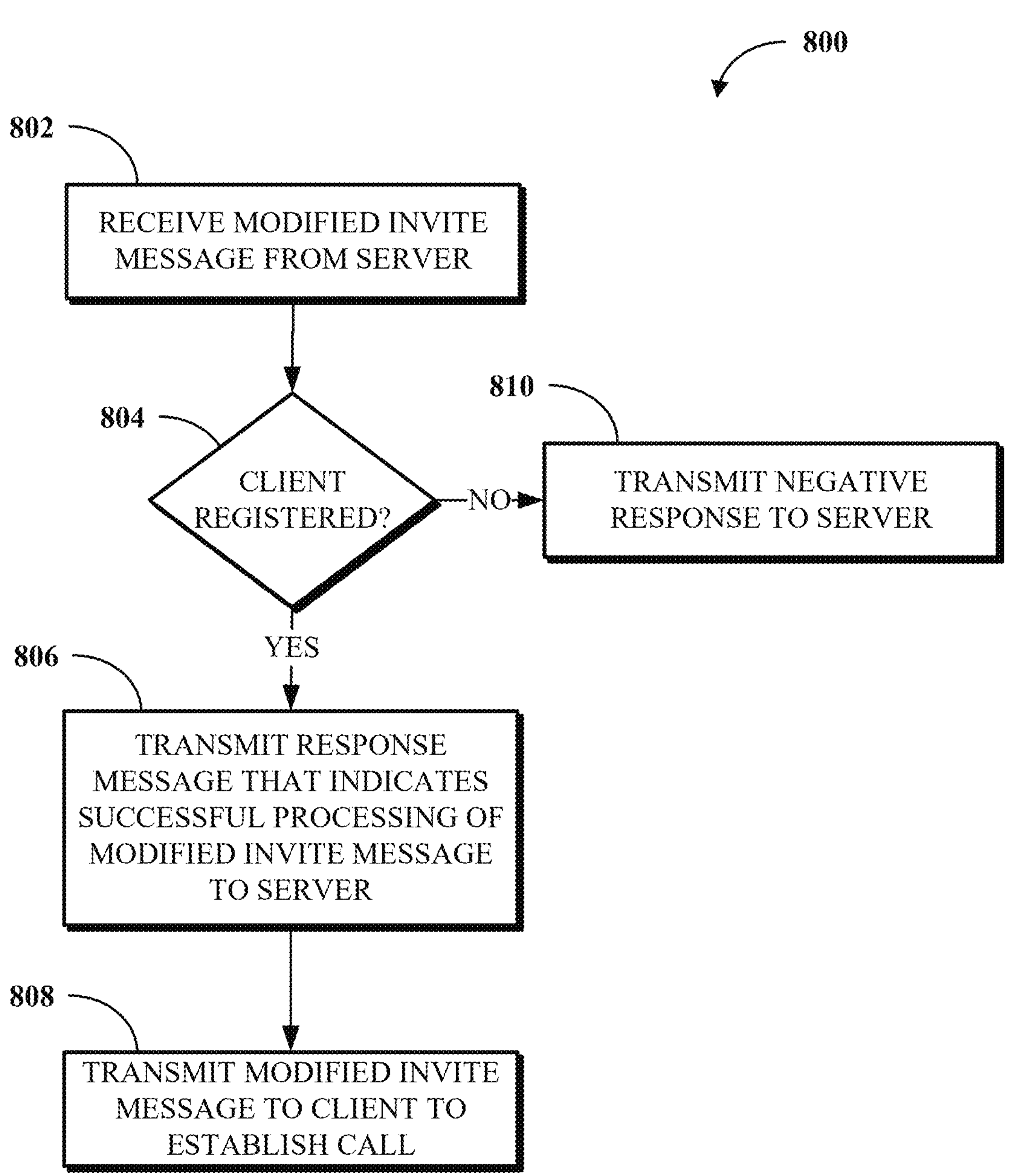
FIG. 8 is a flowchart of an example of another method for providing high availability telephony services during a call setup.

To further describe some implementations in greater detail, reference is next made to examples of techniques which may be performed by or using a system for providing high availability telephony services during a call setup. FIGS. 7 and 8 are flowcharts of examples of techniques for providing high availability telephony services during a call setup. The techniques can be executed using computing devices, such as the systems, hardware, and software described with respect to FIGS. 1-6. The techniques can be performed, for example, by executing a machine-readable program or other computer-executable instructions, such as routines, instructions, programs, or other code. The steps, or operations, of the techniques, or another technique, method, process, or algorithm described in connection with the implementations disclosed herein can be implemented directly in hardware, firmware, software executed by hardware, circuitry, or a combination thereof.

For simplicity of explanation, the techniques are depicted and described herein as a series of steps or operations. However, the steps or operations of the techniques in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 7 is a flowchart of an example of a method 700 for providing high availability telephony services during a call setup. The method 700 may be performed by a server associated with a client attempting to initiate a call, such as the server 506 shown in FIG. 5 or the server 606 shown in FIG. 6.

At 702, the method 700 includes receiving an invite message from a first device to establish a call with a second device. The second device may be associated with a primary server and one or more backup servers. The primary server and the one or more backup servers may be PBX servers. The second device can be registered to one server at a time, and that server to which the second device is registered may be any one of the primary server or the one or more backup servers.

At 704, the method 700 includes modifying the invite message to obtain a modified invite message. Modifying the invite message may include updating a header of the invite message such that the header of the modified invite message is identifiable by the primary server and the one or more backup servers. In an example, the header may be updated to include an indication that the X-CROSS-NODE parameter is enabled.

At 706, the method 700 includes simultaneously transmitting the modified invite message to the primary server and the one or more backup servers that are associated with the second device. The modified invite message is transmitted to the primary server and the one or more backup servers based on an extension number associated with the second device.

At 708, the method 700 includes receiving a response message that indicates successful processing of the modified invite message from a first server. The first server can be the primary server to which the second device is registered or one of the one or more backup servers to which the second device is registered.

At 710, the method 700 includes establishing the call via the first server. The call is established via the first server based on the indication of successful processing of the modified invite message. In some examples, the method 700 may include at 712, receiving, from a second server, a negative response. The negative response may be delayed by a predetermined duration of time. The negative response includes an indicator that indicates that the second device is not registered to the second server. The second server can be the primary server to which the second device is not registered or one of the one or more backup servers to which the second device is not registered.

FIG. 8 is a flowchart of an example of another method 800 for providing high availability telephony services during a call setup. The method 800 may be performed by a server associated with a client receiving a call, such as the server 510A or the server 510B shown in FIG. 5, or the server 610A or the server 610B shown in FIG. 6.

At 802, the method 800 includes receiving a modified invite message from a server associated with a first client that is initiating a call. The header of the modified invite message is configured to be identifiable by a server that associated with a second client that is receiving the call (e.g., a primary server and one or more backup servers). In an example, the header may include an indication that the X-CROSS-NODE parameter is enabled.

At 804, the method 800 includes determining whether the second client is registered to the server associated with the second client. If the second client is determined to be registered to the server associated with the second client, at 806, the method 800 includes transmitting a response message that indicates successful processing of the modified invite message to the server associated with the first client. At 808, the method 800 includes transmitting the modified invite message to the second client to establish the call. The modified invite message is transmitted based on the indication of successful processing of the modified invite message. If it is determined that the second client is not registered to the server associated with the second client at 804, the method 800 includes transmitting a negative response to the server associated with the first client. Transmission of the negative response may be delayed by a predetermined duration of time. The negative response includes an indicator that indicates that the second client is not registered to the server associated with the second client.

An aspect may include a method that includes receiving an invite message from a first device to establish a call with a second device. The method may include modifying the invite message to obtain a modified invite message. The method may include simultaneously transmitting the modified invite message to a PBX server associated with the second device and to one or more backup PBX servers associated with the second device. The method may include receiving a response message indicating successful processing of the modified invite message from a first PBX server comprising the primary PBX server or one of the backup PBX servers. The method may include establishing the call via the PBX server.

An aspect may include a system that comprises a PBX server. The PBX server may be configured to receive an invite message from a first device to establish a call with a second device. The PBX server may be configured to modify the invite message to obtain a modified invite message. The PBX server may be configured to simultaneously transmit the modified invite message to a PBX server associated with the second device and to one or more backup PBX servers associated with the second device. The PBX server may be configured to receive a response message indicating successful processing of the modified invite message from a first PBX server comprising the primary PBX server or one of the backup PBX servers. The PBX server may be configured to establish the call via the first PBX server.

An aspect may include a non-transitory computer readable medium comprising instructions, that when executed by a processor, cause the processor to perform operations. The operations may include receiving an invite message from a first device to establish a call with a second device. The operations may include modifying the invite message to obtain a modified invite message. The operations may include simultaneously transmitting the modified invite message to a PBX server associated with the second device and to one or more backup PBX servers associated with the second device. The operations may include receiving a response message indicating successful processing of the modified invite message from a first PBX server comprising the primary PBX server or one of the backup PBX servers. The operations may include establishing the call via the PBX server.

In one or more aspects, the second device may be registered to the first PBX server. In one or more aspects, a delayed negative response may be received from a second PBX server. The delayed negative response may indicate that the second device is not registered to the second PBX server. In one or more aspects, the second PBX server may be one of the backup PBX servers when the second device is registered to the primary PBX server. In one or more aspects, the invite message may be received at a PBX server associated with the first device. In one or more aspects, modifying the invite message may include updating a header of the invite message such that the header is identifiable by the primary PBX server and the one or more backup PBX servers. In one or more aspects, the second PBX server may be the primary PBX server. In one or more aspects, option ping requests may be transmitted to the PBX server associated with the second device and to one or more backup PBX servers associated with the second device. In one or more aspects, a health status of the PBX server associated with the second device and each of the one or more backup PBX servers associated with the second device may be received responsive to the option ping request. In one or more aspects, the option ping requests may be transmitted simultaneously. In one or more aspects, the negative response may be delayed by a predetermined duration of time. In one or more aspects, the second PBX server may be the primary server or one of the backup PBX servers. In one or more aspects, a registration status of the PBX server associated with the second device and each of the one or more backup PBX servers associated with the second device may be received responsive to the option ping request.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving an invite message from a first device to establish a call with a second device;

modifying the invite message to obtain a modified invite message, wherein modifying the invite message includes updating a header of the invite message to include a parameter that is identifiable by a primary private branch exchange (PBX) server and one or more backup PBX servers associated with the second device;

simultaneously transmitting the modified invite message to the primary PBX server associated with the second device and to the one or more backup PBX servers associated with the second device;

receiving a response message indicating successful processing of the modified invite message from a first PBX server, wherein the first PBX server is the primary PBX server or one of the backup PBX servers; and establishing the call via the first PBX server.

2. The method of claim 1, wherein the second device is registered to the first PBX server.

3. The method of claim 1, further comprising:

receiving a delayed negative response from a second PBX server, the delayed negative response indicating that the second device is not registered to the second PBX server.

4. The method of claim 3, wherein the second PBX server is one of the backup PBX servers when the second device is registered to the primary PBX server.

5. The method of claim 3, wherein the second PBX server is the primary PBX server when the second device is registered to one of the backup PBX servers.

6. The method of claim 1, wherein the invite message is received at a PBX server associated with the first device.

7. The method of claim 1, wherein modifying the invite message includes updating a header of the invite message such that the header is identifiable by the primary PBX server and the one or more backup PBX servers.

8. A system, comprising:
a processor configured to:
receive an invite message from a first device to establish a call with a second device;
modify the invite message to obtain a modified invite message that includes a header comprising a parameter that is identifiable by a primary private branch exchange (PBX) server and one or more backup PBX servers associated with the second device;
simultaneously transmit the modified invite message to the primary PBX server associated with the second device and to the one or more backup PBX servers associated with the second device;
receive a response message indicating successful processing of the modified invite message from a first PBX server, wherein the first PBX server is the primary PBX server or one of the backup PBX servers; and
establish the call via the first PBX server.

9. The system of claim 8, wherein the second device is registered to the first PBX server.

10. The system of claim 8, wherein the PBX server is further configured to:
receive a delayed negative response from a second PBX server, wherein the delayed negative response indicates that the second device is not registered to the second PBX server.

11. The system of claim 10, wherein the second PBX server is one of the backup PBX servers.

12. The system of claim 10, wherein the second PBX server is the primary PBX server.

13. The system of claim 8, wherein the PBX server is further configured to:
transmit option ping requests to the PBX server associated with the second device and to the one or more backup PBX servers associated with the second device; and
receive a health status of the PBX server associated with the second device and each of the one or more backup PBX servers associated with the second device responsive to the option ping request.

14. The system of claim 13, wherein the option ping requests are transmitted simultaneously.

15. A non-transitory computer-readable medium comprising instructions, that when executed by a processor, cause the processor to perform operations comprising:
receiving an invite message from a first device to establish a call with a second device;
modifying the invite message to obtain a modified invite message, wherein modifying the invite message includes updating a header of the invite message to include a parameter that is identifiable by a primary private branch exchange (PBX) server and one or more backup PBX servers associated with the second device;
simultaneously transmitting the modified invite message to the primary PBX server associated with the second device and to the one or more backup PBX servers associated with the second device;
receiving a response message indicating successful processing of the modified invite message from a first PBX server, wherein the first PBX server is the primary PBX server or one of the backup PBX servers; and
establishing the call via the first PBX server.

16. The non-transitory computer-readable medium of claim 15, wherein the second device is registered to the first PBX server.

17. The non-transitory computer-readable medium of claim 15, further comprising:
receiving a negative response from a second PBX server, the negative response indicating that the second device is not registered to the second PBX server.

18. The non-transitory computer-readable medium of claim 17, wherein the negative response is delayed by a predetermined duration of time.

19. The non-transitory computer-readable medium of claim 17, wherein the second PBX server is the primary PBX server or one of the backup PBX servers.

20. The non-transitory computer-readable medium of claim 15, wherein the operations further comprise:
transmitting option ping requests to the PBX server associated with the second device and to the one or more backup PBX servers associated with the second device; and
receiving a registration status of the PBX server associated with the second device and each of the one or more backup PBX servers associated with the second device responsive to the option ping request.

* * * * *